United States Patent [19]

Lowe et al.

[11] Patent Number: 5,541,574
[45] Date of Patent: Jul. 30, 1996

[54] TRANSPONDER SYSTEM FOR COMMUNICATING WITH A VEHICLE TIRE

[75] Inventors: Peter R. Lowe, Colorado Springs, Colo.; William E. Armstrong, Mission Viejo, Calif.

[73] Assignee: Palomar Technologies Corporation, Carlsbad, Calif.

[21] Appl. No.: 173,381

[22] Filed: Dec. 22, 1993

[51] Int. Cl.⁶ .................................................. B60C 23/00
[52] U.S. Cl. ...................... 340/447; 340/442; 340/445; 73/146.5
[58] Field of Search ..................................... 340/442, 445, 340/447, 448, 446, 825.54; 73/146, 146.2, 146.5, 146.4; 116/34 R, 34 A, 34 B

[56] References Cited

U.S. PATENT DOCUMENTS

| | | | |
|---|---|---|---|
| 4,063,229 | 12/1977 | Welsh et al. | 340/571 |
| 4,074,227 | 2/1978 | Kalmus | 340/447 |
| 4,319,220 | 3/1982 | Pappas et al. | 340/447 |
| 4,409,586 | 10/1983 | Hochstein | 340/448 |
| 4,507,956 | 4/1985 | Schlesinger et al. | 73/146.5 |
| 4,730,188 | 3/1988 | Milheiser | 340/825.69 |
| 4,953,393 | 9/1990 | Galasko et al. | 73/146.5 |
| 5,196,845 | 3/1993 | Myatt | 340/448 |
| 5,218,861 | 6/1993 | Brown et al. | 340/445 |

FOREIGN PATENT DOCUMENTS 2016383  9/1979  United Kingdom .................. 340/447

*Primary Examiner*—Donnie L. Crosland
*Attorney, Agent, or Firm*—Rodney F. Brown

[57] ABSTRACT

A tire transponder system seats a transponder coil in a flexible resilient tube that is positioned around a vehicle wheel. The transponder antenna is lodged in a groove that extends around the tube, and responds to an excitation signal by transmitting a signal that contains identification information and/or information on the tire condition. For tire condition information, a diode is connected in circuit with the transponder coil to double the frequency of the signal returned by the transponder. A switch that is connected to bypass the diode is operated by a tire condition sensor, such as a pressure sensor, when the sensed condition crosses a threshold level in a predetermined direction. The change in the frequency of the transponder's returned signal when the threshold has been crossed is used to activate a response such as a low tire pressure alarm.

35 Claims, 4 Drawing Sheets

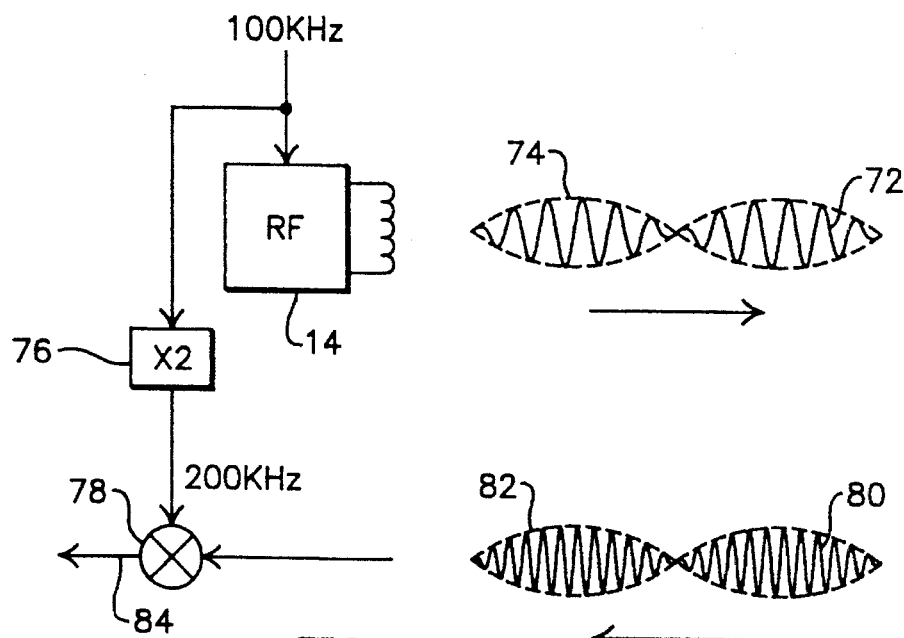
Fig.9
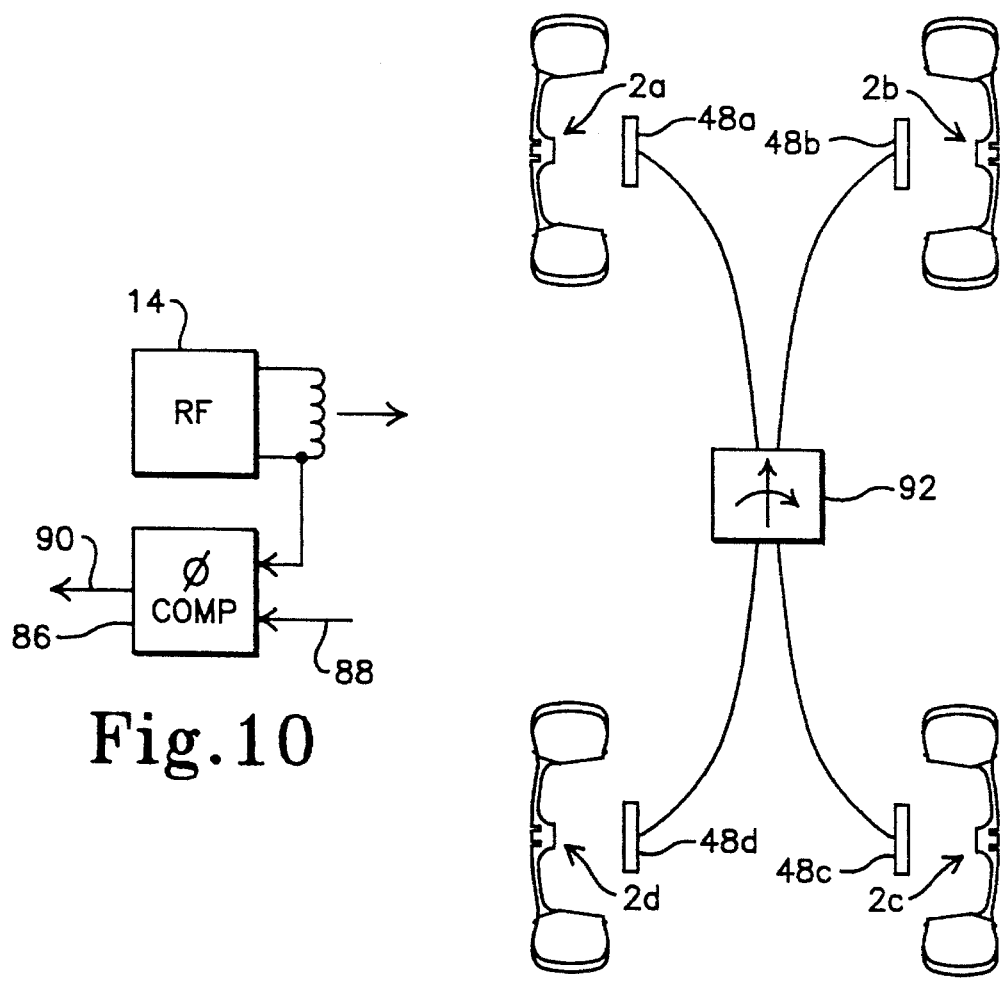
Fig.10
Fig.11

TRANSPONDER SYSTEM FOR COMMUNICATING WITH A VEHICLE TIRE

BACKGROUND OF THE INVENTION

1. Field of the Invention

This invention relates to transponder systems for communicating with a tire vehicle, and more particularly to systems which use a diode circuit to produce an information-bearing frequency shift in an interrogation signal.

2. Description of the Related Art

Various systems have been devised for automatically communicating with a vehicle tire to obtain status information on the tire, such as its air pressure, or to identify the tire. Current information on a tire's pressure is particularly important for new "run flat" tires, in which the tire has an inner core that allows the vehicle to continue running when the outer tire has gone flat. The driver may not be aware of the run flat condition, since the bumps normally produced by a conventional flat tire are avoided by the run flat feature. If the driver is not informed of the flat tire, the tire can be permanently damaged by driving too far before the flat is repaired.

Tire identification is useful for tracing stolen tires, warranty work and similar applications. Both pressure sensing and tire identification are combined in certain truck depots, in which the truck tires pass over a tire pressure sensor as the truck leaves the depot, and a tire identification is automatically provided that tells which truck has the low tire pressure.

Prior tire air pressure sensors have employed full two-way radio telemetry systems, in which the absolute tire pressure is transmitted to a receiver which is located either on the vehicle, or at a fixed location such as a truck depot. The radio equipment is typically mounted to the valve stem inside the tire, and uses a small dipole antenna to transmit a very high frequency RF signal, typically 900 MHz. The equipment is subject to being damaged by excessive tire wear or by the tire going flat, requires modification of the tire to be installed, and is relatively expensive. Furthermore, 900 MHz is not within an internationally recognized frequency range for this type of transmission.

Automatic tire identification is normally accomplished by gluing an identification "tag", consisting of an integrated circuit (IC) chip together with a small antenna coil, to the inside of the tire. The tag transmits an identification code which uniquely identifies the tire. However, the tag can suffer from the extreme temperatures and mechanical stresses which tires normally experience. Also, a reader attached to the vehicle can read a signal from a tire on an adjacent vehicle when the identification encoding is less than optimum, as is sometimes the case.

SUMMARY OF THE INVENTION

The present invention seeks to provide an improved communications system for communicating with a vehicle tire to obtain information such as tire identification and/or air pressure status, in which the structure of neither the tire nor the wheel upon which it is mounted needs to be modified, and in which the equipment is protected from varying temperatures and mechanical stresses which the tire experiences. The system should also be inexpensive, capable of operating within the internationally recognized frequency range of 110–300 KHz, and secure from reading the tires of adjacent vehicles or other extraneous signals.

These goals are accomplished with a vehicle communications system that employs both an improved mounting mechanism for the transponder antenna, and a new and very simple circuit for communicating the status of a tire condition such as air pressure. The antenna coil is seated within a groove that extends around a flexible resilient tube on the wheel. The tube is flexible enough to be passed over the wheel rim, and resilient enough to thereafter be seated securely in place around the wheel periphery. Either a single turn or a multi-turn antenna coil can be used, preferably in combination with a protective reinforcement cord that sits in the base of the tube groove inward of the antenna coil. A transponder circuit that is coupled to the antenna responds to excitation from an exciter/reader mechanism by transmitting a tire identification code and/or information on the tire condition. The tube is preferably implemented with a solid core.

A single exciter/reader can communicate with multiple wheels on the same vehicle, such as on a time shared basis. To prevent the exciter/receiver from reacting to signals that do not originate with the vehicle tires, a low frequency modulation can be applied to its RF excitation signal, with the returned signal correlated with the low frequency modulation to verify whether the returned signal originated from the wheel's transponder circuit. Alternately or in addition, the exciter/receiver can include a phase comparator that looks for synchronism between the RF excitation signal and a return signal to verify that the return signal originated from the desired transponder circuit.

The system also provides an indication of whether a given tire condition, such as air pressure, has crossed a threshold level. To accomplish this a diode is connected in circuit with the transponder antenna coil, with a circuit modifier altering the connection of the diode to the antenna when a condition sensor senses the tire condition crossing the threshold level. The transponder responds to an excitation signal by transmitting at one frequency before the threshold has been crossed, and at a different frequency after the threshold is crossed. In the preferred embodiment a switch is connected in parallel with the diode and operated when the tire pressure falls to a low pressure level. The transponder's frequency with the diode in the circuit is twice its frequency when the diode is bypassed by the switch. To avoid communicating with a transponder on an adjacent vehicle, an identity code can be added to the diode circuit.

These and other features and advantages of the invention will be apparent to those skilled in the art from the following detailed description, taken together with the accompanying drawings.

BRIEF DESCRIPTION OF THE DRAWINGS

FIG. 9 is a block diagram of a tire condition sensing system in which a low frequency modulation is added to the RF excitation signal to verify a return signal from the transponder;

FIG. 10 is a block diagram of a wheel condition sensing system in which a returned signal is verified by phase comparison; and FIG. 11 is a block diagram of a multi-wheel system in which a master exciter/receiver communicates with multiple wheel transponders.

DETAILED DESCRIPTION OF THE INVENTION

Figure 1:
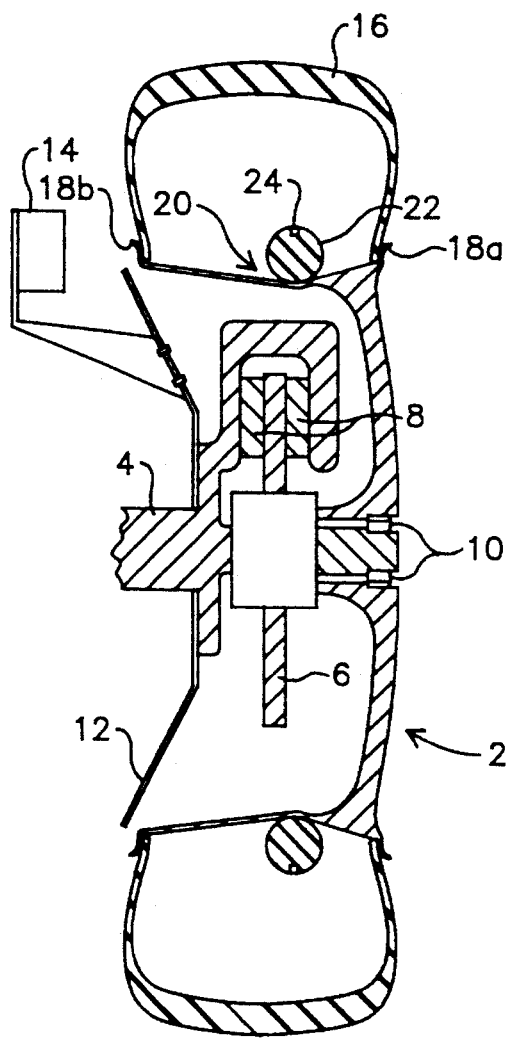
FIG. 1 is a sectional view of a tire communications system in accordance with the invention.

The invention can be used to communicate both tire identification and information on the tire condition to an off-tire location. A preferred embodiment is illustrated in FIG. 1, in which both the transponder antenna and identification/condition sensing mechanism are isolated from the extreme temperatures, mechanical stress and deflection to which the tire is subjected (except possibly for emergency conditions).

A standard wheel assembly 2 is shown, including a vehicle axle 4, a brake rotor 6 and calipers 8, and a set of wheel nuts 10 that hold the wheel onto the axle. A splash guard 12 is positioned on the vehicle side of the wheel assembly to protect the calipers and rotor from water and dirt. An RF exciter/reader 14 can be mounted to the splash guard adjacent the wheel assembly, or at any other convenient location on the vehicle which carries the wheel. Alternately, the exciter/reader can be placed at a fixed location off the vehicle to interrogate the wheels of passing vehicles.

A tire 16 is mounted to the wheel between peripheral wheel rims 18a and 18b. The wheel periphery 20 has a reduced diameter between the rims, producing saddle which slopes upward on each side towards the opposed rims.

Figure 2:
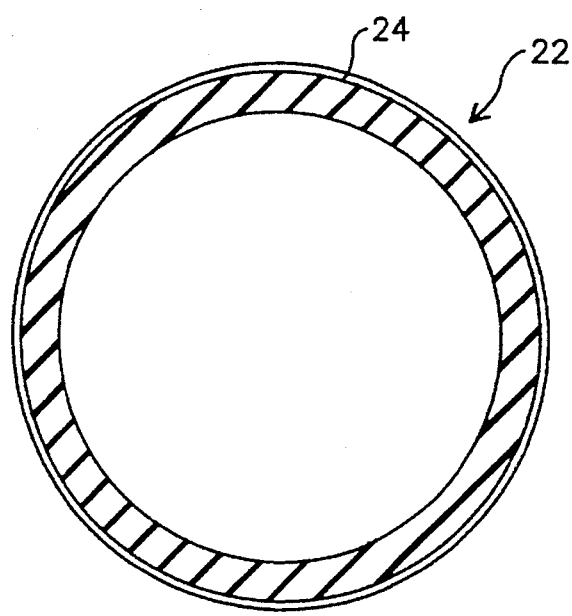
FIG. 2 is a sectional view of the tube used for mounting the wheel transponder.

In accordance with the invention, a transponder system is positioned in a flexible resilient tube 22 that extends around the wheel periphery. As shown in FIGS. 1 and 2, the tube includes a peripheral groove 24 that extends into its outer surface. A transponder antenna which communicates identification and/or tire condition information to the exciter/receiver unit 14 is seated within the groove 24 and extends substantially all the way around the tube. Depending upon the application, the transponder antenna can either be single turn or multi-turn. The tube is formed from a material, such as foam rubber or elastomer, that is flexible enough to be stretched out and passed over the outer wheel rim 18a when the tube is mounted, and resilient enough to thereafter seat the tube in place around the wheel periphery. The tube 22 is preferably configured so that groove 24 extends above the height of the wheel rims 18a, thereby enhancing RF access to the transponder antenna 24.

Figure 3:
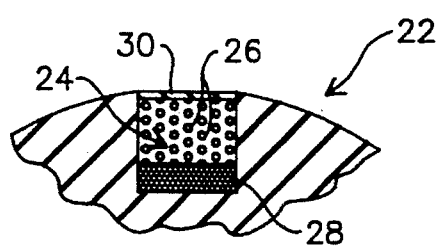
FIG. 3 is a fragmentary sectional view of a transponder antenna seated in the groove in the mounting tube.

FIG. 3 illustrates a multi-turn transponder antenna in which the antenna wire 26 (generally copper) is wound in multiple turns within the groove 24. Reinforcing cords 28, formed from a material such as Dacron® or nylon string, can be wound around the base of the groove 24 to protect the antenna coil, while a sealant 30 is applied over the outermost coils.

Figure 4:
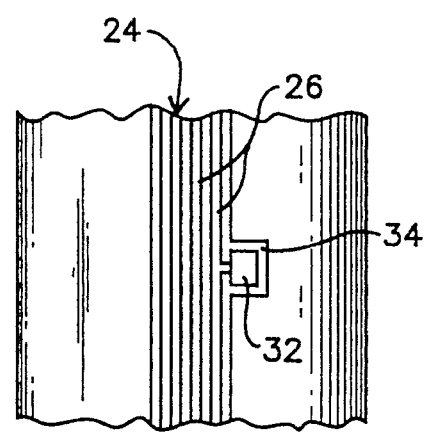
FIG. 4 is a fragmentary plan view showing the disposition of the transponder circuit in the tube.

The exciter/reader 14 transmits an RF signal that is picked up by the transponder antenna 26 and delivered to a circuit element that is also lodged in the tube. Depending upon the desired application, the circuit element can provide either a tire identification code or information about a tire condition, or both. In FIG. 4, an integrated circuit (IC) chip 32 is shown lodged in a recess 34 in the outer tube surface that opens into the groove 24. The chip 32 is connected to the antenna coil 26, and is actuated by an RF interrogation signal from the exciter/reader 14 to transmit the desired information back to the exciter/reader through the same coil 26.

Mounting the transponder and its coil in this manner has several advantages over conventional transponders, which are typically mounted to the tire itself and employ small dipole antennas or coils. No modification to either the tire or the wheel is required to install the transponder, and communication is possible whether the vehicle is stationary or in motion. Since the transponder/antenna assembly is not mounted permanently, it can easily be replaced if it is damaged. Both the transponder assembly and the exciter/reader are noninvasive to the vehicle, increasing their attractiveness to the after market.

Since the antenna wire is generally not deformable, the inner diameter of the tube groove 24 is made slightly larger than the diameter of the outer wheel rim 18a. This allows the tube to be slipped over the rim without unduly stressing the antenna. The tube is preferably formed from a material that is quite deformable, such as a low density foam, so that the portion of the tube below the groove easily deforms and passes over the wheel rim in mounting the tube.

Figure 5:
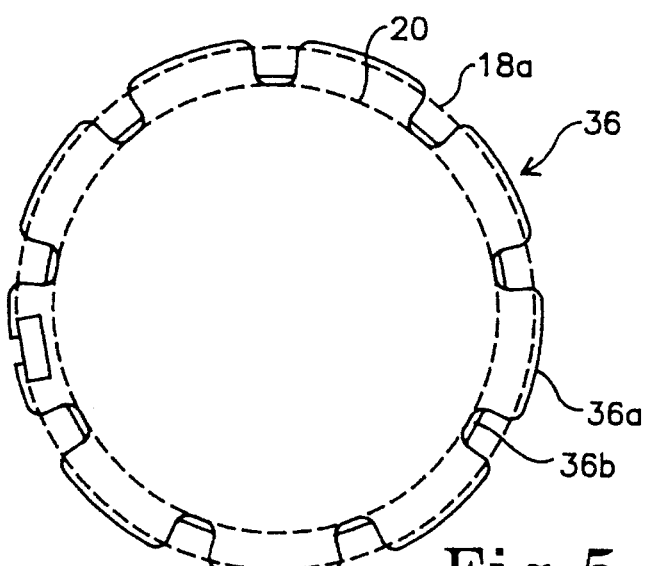
FIG. 5 is an elevation view of an alternate mounting structure for the transponder circuit and antenna.

FIG. 5 illustrates another embodiment of the invention, intended particularly for a single turn antenna, in which the antenna 36 is formed from a stiffly flexible material such as 16 gage spring steel wire, and has a diameter that varies around the coil. The antenna 36 has an undulating shape, with its outer sections 36a extending slightly above the level of the wheel rim 18a, and its inner sections 36b bearing against the wheel periphery 20. The major diameter lobes 36a that extend above the rim 18a receive the signal from the exciter/reader, while the minor diameter lobes 36b can be insulated from the wheel by coating them with a plastic material such as the coating used on tool handles. To mount the antenna 36 on a wheel, it is mechanically distorted enough to pass over the wheel rim 18a, and springs back to its original shape, which holds it in place around the wheel periphery 20.

Figure 6:
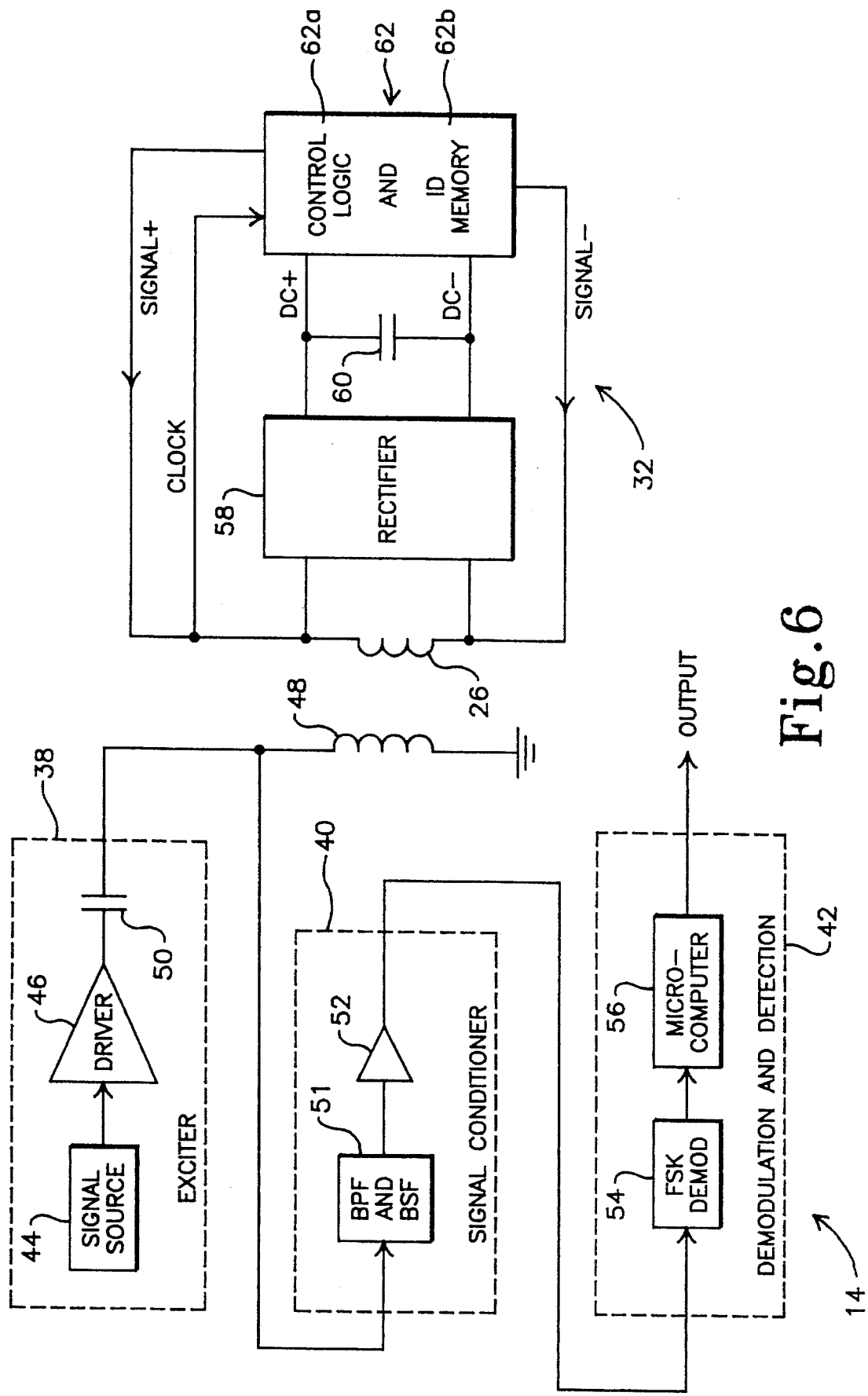
FIG. 6 is a block diagram showing the major circuit components for one embodiment of the communication system.

The IC chip 32 can generate a tire identification code in a conventional manner, such as that described in U.S. Pat. No. 4,730,188 to Milheiser. A suitable communications system, similar to that described in the Milheiser patent, is shown in block diagram form in FIG. 6. Various available exciter/receivers can be used, such as the MINIPROX® reader by Hughes Identification Devices, Inc., mechanically reconfigured to be mounted on a vehicle splash guard or other convenient location. It is shown as consisting of three main functional units: an exciter 38, signal conditioner 40 and demodulation and detection circuits 42. The exciter 38 consists of an AC signal source 44, followed by a power driver 46 which provides a high current, high voltage excitation signal to an interrogator antenna coil 48 through a capacitor 50. The interrogator coil 48 and the capacitor 50 are selected to resonate at the excitation signal frequency, so that the voltage across the coil is much greater than the voltage output from the driver.

The signal conditioner 40 connects to the interrogator coil 48 and serves to amplify the identification signal returned from the transponder, while filtering out the excitation signal frequency as well as other noise and undesired signals outside the frequency range used by the transponder signals. It includes a bandpass filter/bandstop filter 51 that actively passes the identification code signal frequencies returned from the transponder and passively excludes the high energy at the excitation frequency, and an amplifier 52.

The amplified output of the signal conditioner 40 is fed to the demodulation and detection unit 42, which includes a frequency shift keyed (FSK) demodulator 54 and a microcomputer 56. The FSK demodulator 54 is a phase-locked loop circuit configured as a tone decoder which gives a digital output as the signal from the transponder shifts between two frequencies. The microcomputer 56 extracts the identification code from this digital output by observing the timing of transitions between the two logic levels. The identification code obtained by the microcomputer 56 can be transferred to a display or printer, sent over communication lines to a remote point, stored on tape, disk or other storage medium, or sent to another computer.

The transponder includes the antenna coil 26, which is located such that the magnetic flux generated by the interrogator coil 48 couples energy at the exciter frequency into the transponder. This energy is converted to a DC voltage using a full-wave rectifier bridge 58 and a smoothing capacitor 60, as is commonly used in power supply circuits. This DC voltage supplies the power to a control logic and identification memory circuit 62.

The logic control 62a consists of counters and gates which sequentially read out the contents of the identification memory 62b. The logic 62a also inserts a sync word into the signal data stream to allow the exciter/reader to synchronize to the data. The excitation signal which appears on the transponder coil 26 is supplied to the control logic to provide a clock signal. The control logic circuit 62a converts the serial data and sync stream into a frequency shift keyed (FSK) waveform which is connected to the transponder coil 26 through complementary current syncs to transmit the FSK identification signal. The transmitted signal is received by the interrogator coil 48 due to the mutual inductance between it and transponder coil 26, and is amplified by the signal conditioner and detected. The components of the exciter/reader 14 can be implemented as either different units which are connected to one another, or wired together as a single unit.

Figure 7:
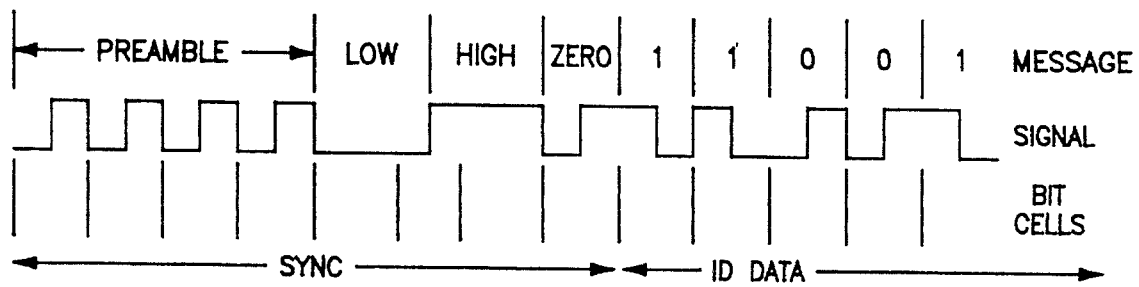
FIG. 7 is a timing diagram showing a suitable RF protocol for messages returned by the transponder.
Figure 7:
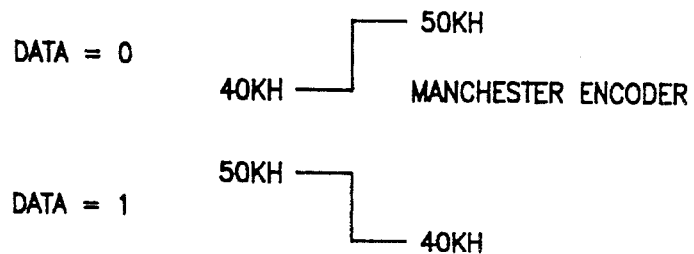

The protocol for the identification code can also be conventional. FIG. 7 illustrates a suitable protocol, as described in the Milheiser patent. Reading from top to bottom, FIG. 7 shows the serial digital data stream comprising the coded message, the signal frequency, the spacing of the bit periods, the distinction between the sync or preamble portions of the signal and the data, and a Manchester encoding scheme used by the transponder. The data stream consists of a total of 48 bit periods. Data is encoded using the Manchester encoding technique commonly employed in serial data transmissions. In the Manchester technique, data values are represented by transitions from a low to high level or high to low level in the middle of the bit period. In the present representation, a logical zero data bit is represented by a low to high transition in the middle of the bit period, and a logical one data bit is represented by a transition from high to low in the middle of the bit period. Synchronization ("sync") information is contained in the first eight bit periods of the data stream. The sync consists of four bit periods of preamble information followed by a constant low level for one and a half bit periods, a constant high level for one and a half bit periods and a zero data bit.

The eight sync bit periods are followed by forty bit periods containing the actual identification data. Exemplary data corresponding to "11001 . . ." is shown. The circuit runs continuously during interrogation such that an endless stream of sync followed by data appears.

Figure 8:
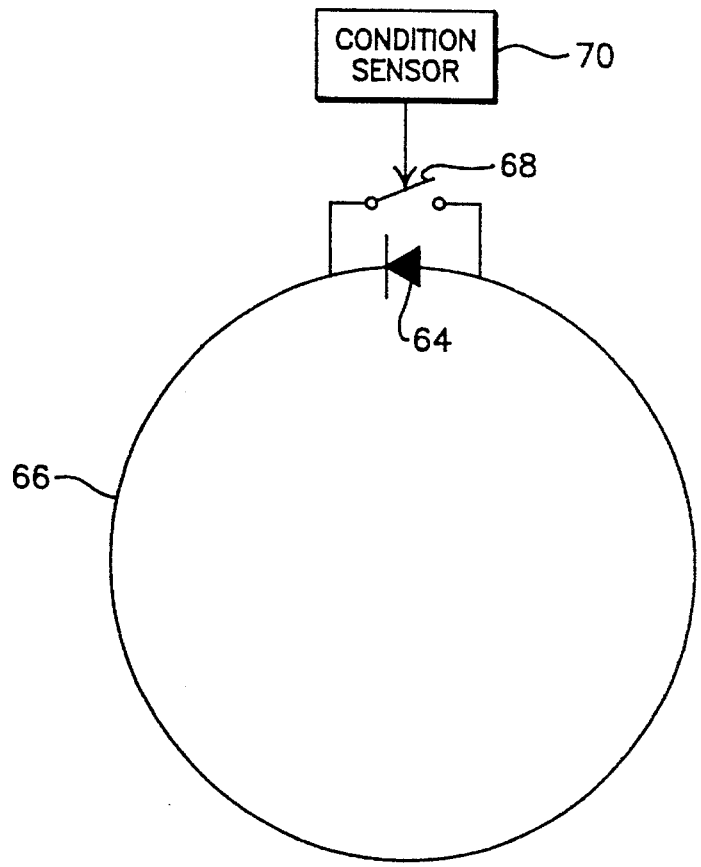
FIG. 8 is a schematic diagram of a pressure sensitive transponder circuit.

Another embodiment of the invention, which can be used to transmit information on a tire condition such as air pressure, temperature, etc., is illustrated in FIG. 8. It is known that a coil connected in series with a diode will return a signal of double the frequency of an interrogation signal that has been coupled to the coil. This concept is commonly used in simple "here-I-am" tags that are secured to garments in department stores to protect against theft. If the tag is not removed, its frequency doubling is detected by an exciter/reader which the customer must pass to exit the store, and initiates an alarm. This type of circuit is described, for example, in U.S. Pat. No. 4,063,229 to Welsh et al. (FIGS. 17 and 18). The present invention expands upon this basic operating principal to provide a tire transponder that affirmatively indicates whether a particular tire condition has crossed a preset threshold level, rather than the passive "here-I-am" operation of prior systems. For example, the new approach can be used to activate an alarm within the vehicle when the pressure within a tire has dropped so far as to indicate that the tire has gone flat, or at least needs to be recharged with air.

The transponder includes a diode 64 that is connected in series with a transponder antenna 66, which is illustrated as a single turn antenna that can be mounted around a vehicle wheel using any of the techniques described above. A suitable diode for this purpose has the industry designation 1N914. A switch 68 is connected in parallel with the diode, such that the diode is bypassed and short circuited when the switch is closed. The switch is controlled by a condition sensor 70, which for example can be integrated with the switch as a pressure actuated device that closes at a predetermined air pressure; such pressure switches are common in automotive applications.

The exciter/reader is designed to look for a return signal with a frequency twice the interrogation signal frequency. When the tire pressure is above the threshold set for sensor 70, the switch is open and the transponder returns a signal at twice the interrogation frequency; this is recognized by the exciter/reader as indicating a satisfactory tire pressure. When the pressure falls below the threshold level, the sensor 70 closes switch 68 to bypass the diode. This removes the return double-frequency signal, causing a low tire pressure alarm within the vehicle to be activated.

Alternately, the transponder can be configured so that the switch is closed when the tire pressure is above the threshold level, and open when the pressure falls below. In this case the low pressure alarm would be activated by the presence of a returned double-frequency signal. While pressure sensors commonly operate at the same threshold level regardless of the direction of the pressure change (i.e., regardless of whether the pressure falls through the threshold or rises above it), this type of symmetrical operation is not necessary for the invention. The pressure sensor can include a degree of hysteresis, so long as it initiates the low pressure alarm when the tire pressure falls below the desired threshold level.

For any of the embodiments described above, the resonant frequency of the transponder coil will vary with its inductance and capacitance in accordance with the usual inverse relationship to $2\pi\sqrt{LC}$, where L and C are the coil's inductance and capacitance, respectively. The inductance, in turn, varies with the square of the number of turns (corrected for the coil's aspect ratio). With 40 turns around a conventional 14 inch wheel plus the use of a tuning capacitor, the exciter/reader can operate at a frequency of 125 KHz, which is well within the 110–300 KHz range that is accepted world-wide for this purpose. A single turn transponder antenna as illustrated in FIG. 8 will typically operate at 27 MHz, which is still much lower than the high frequency previously used, and requires less expensive equipment.

For the tire condition sensing system based upon a double frequency return signal, it may be desirable to protect the system from a double frequency signal source other than the tire transponder itself. For example, it would be very undesirable for a prankster to be able to cause a parking lot full of similar vehicles to show flat tires by broadcasting a double frequency signal. This situation can be prevented by modulating the excitation signal with a low frequency signal. The double frequency return signal is then correlated with the low frequency signal so that only a return signal that was stimulated by the original excitation signal would be considered. Such a system is shown in block diagram form in FIG. 9. The RF reader/exciter 14, which is assumed to transmit a 27 MHz interrogation signal, receives a relatively low frequency modulation such as 100 KHz. The result is a 27 MHz interrogation signal 72 modulated by a 100 KHz envelope 74. The 100 KHz signal is also fed through a frequency doubler 76 to provide a 200 KHz input to a mixer 78. A frequency-doubled return signal from the transponder associated with the exciter/reader will have a principal 54 MHz component 80, with a 200 KHz modulation 82. If the transmitted and returned signals are in phase, which would be the case for a return signal stimulated by the exciter signal, the mixer produces an amplified output 84. If the return signal does not have a low frequency modulation in phase with the transmitted signal, the mixer will produce zero or very little output.

Another approach that can be used instead of or in addition to the low frequency modulation, to verify that the return signal originated from the transponder circuit, is shown in FIG. 10. It employs a synchronous detection scheme which uses the excitation signal as a clock for removing unwanted signals that have the same (or double) frequency but are out of phase. It is illustrated as a phase comparator 86 that receives an RF input from the exciter/reader 14, and a comparison return input 88. If the two inputs to the comparator are in phase, a functional output 90 is produced. If the two inputs are out of phase, indicating that the return signal did not originate from the desired transponder, no output is produced from the phase comparator.

A further improvement is illustrated in FIG. 11. In this embodiment the electrical circuitry for a single exciter/reader 92 is provided at a suitable location within the vehicle, and used to communicate with transponders (not shown) on each of the vehicle's wheel assemblies 2a–2d. The output of the exciter/reader 92 is time shared between corresponding antenna coils 48a–48d adjacent each of the wheel sites. Only the antenna coils 48a–48d, and no electronics, are required at the localized wheel sites. This is facilitated by the extreme simplicity of the required signal protocol, and the large magnitude of the return signals. The exciter/reader 92 communicates with one tire transponder at a time, deactivating a given transponder before moving on to the next.

In addition to the other advantages stated above, the bandwidth of the described communication system is very high, and it is possible to communicate large amounts of data. This allows for high precision and the possibility of multiple data channels. Furthermore, cross talk between adjacent vehicles can be eliminated by superimposing a tire identification code onto a tire condition signal from a wheel transponder.

While particular embodiments of the invention have been shown and described, numerous variations and alternate embodiments will occur to those skilled in the art. Accordingly, it is intended that the invention be limited only in terms of the appended claims.

We claim:

1. A transponder system for a tire mounted on a rimmed vehicle wheel, comprising:
   a flexible resilient tube that is flexible enough to be passed over the wheel rim and resilient enough to thereafter be seated in place around the wheel,
   a transponder antenna coil that extends around said tube, and
   a tire information transponder circuit that is mounted on said tube and coupled to said antenna coil, said transponder circuit responding to an external excitation by transmitting tire information via said antenna coil.

2. The transponder system of claim 1, said tube including a groove extending around its periphery, with said antenna coil seated in said groove.

3. The transponder system of claim 2, wherein said groove has an inner diameter that is greater than the diameter of said wheel rim, and said tube has an inner diameter that is less than the diameter of said wheel rim.

4. The transponder system of claim 2, said antenna coil comprising a single turn coil.

5. The transponder system of claim 2, said antenna coil comprising a multi-turn coil.

6. The transponder system of claim 2, further comprising a protective reinforcement cord in the base of said groove inward of said antenna coil.

7. The transponder system of claim 1, wherein said tire information transponder circuit responds to an external excitation by transmitting a tire identification code.

8. The transponder system of claim 1, wherein said tire information transponder circuit includes a tire condition sensor, and responds to an external excitation by transmitting a signal that corresponds to the condition of a tire mounted on said wheel.

9. The transponder system of claim 8, wherein said condition sensor comprises a pressure sensor that produces an output which indicates whether the tire pressure is above or below a threshold pressure level, and said transponder circuit includes a diode connected in circuit with said antenna coil, and a switch that is connected to bypass said diode and is operated by said pressure sensor in response to the pressure sensed by said pressure sensor crossing said threshold level in a predetermined direction, said transponder system responding to an external excitation signal by transmitting a signal at one frequency when the switch bypasses said diode, and at a different frequency when the switch does not bypass said diode.

10. The transponder system of claim 9, wherein said diode and switch are connected in parallel and said transponder system transmits a signal with a frequency equal to twice the frequency of said excitation signal when the switch is open, and equal to the frequency of said excitation signal when the switch is closed.

11. The transponder system of claim 1, wherein said tube has a solid core.

12. A vehicle wheel communications system, comprising:
   a radio frequency (RF) exciter/receiver, a rimmed vehicle wheel, a flexible resilient tube that is flexible enough to be passed over the wheel rim and resilient enough to thereafter be seated around the wheel, a transponder antenna coil that extends around said tube, and a tire information transponder circuit that is mounted on said tube and coupled to said antenna coil, said transponder circuit responding to an RF excitation signal from said exciter/receiver by transmitting tire information back to said exciter/receiver.

13. The communications system of claim 12, wherein said exciter/receiver is configured to be mounted on a vehicle which travels on said wheel.

14. The communications system of claim 13, further comprising at least one additional rimmed wheel for said vehicle, each additional wheel including an additional flexible resilient tube that is flexible enough to be passed over said additional wheel rim and resilient enough to thereafter be seated around said additional wheel, an additional transponder antenna coil that extends around said additional tube, and an additional tire information transponder circuit that is mounted on said additional tube and coupled to said additional antenna coil, the additional transponder circuit for each additional wheel responding to an excitation signal from said exciter/receiver by transmitting tire information for its respective wheel back to said exciter/receiver.

15. The communications system of claim 14, wherein said exciter/receiver communicates with each of said transponder circuits on a time shared basis.

16. The communications system of claim 13, wherein said tire information transponder circuit includes a tire condition sensor, and responds to an excitation signal from said exciter/receiver by transmitting a signal that corresponds to the condition of a tire mounted on said wheel.

17. The communications system of claim 16, wherein said condition sensor comprises a pressure sensor that produces an output which indicates whether the tire pressure is above or below a threshold pressure level, and said transponder circuit includes a diode connected in circuit with said antenna coil, and a switch that is connected to bypass said diode and is operated by said pressure sensor in response to the pressure sensed by said pressure sensor crossing said threshold level in a predetermined direction, said transponder system responding to an excitation signal from said exciter/receiver by transmitting a signal at one frequency when the switch bypasses said diode, and at a different frequency when the switch does not bypass said diode.

18. The communications system of claim 17, wherein said diode and switch are connected in parallel and said transponder system transmits a signal with a frequency equal to twice the frequency of said excitation signal when the switch is open, and equal to the frequency of said excitation signal when the switch is closed.

19. The communications system of claim 12, said exciter/receiver including a modulator for applying a low frequency modulation to said RF excitation signal, and a signal correlator for correlating a returned signal with said low frequency modulation to verify whether the returned signal originated from said transponder circuit.

20. The communications system of claim 12, said exciter/receiver including a phase comparator for detecting synchronism between said RF excitation signal and a returned signal, to verify whether the returned signal originated from said transponder circuit.

21. The communications system of claim 12, wherein said tire information transponder circuit responds to an excitation signal from said exciter/receiver by transmitting a tire identification code.

22. A tire condition communications system, comprising:

a transponder antenna coil configured to be carried by a vehicle wheel;

a tire condition sensor for sensing a condition of a tire mounted on said wheel;

a diode connected in circuit with said antenna coil;

a circuit modifier that is actuated by said condition sensor to alter the connection of said diode to said antenna coil in response to said condition sensor sensing said condition crossing a threshold level in a predetermined direction, said communications system responding to an external excitation signal received by said antenna coil by transmitting a signal at one frequency when said circuit modifier is actuated, and at different frequency when said circuit modifier is not actuated; and a flexible resilient grooved tube that is flexible enough to be passed over the rim of a wheel and resilient enough to thereafter be seated in places around the wheel, with said antenna coil seated in said groove.

23. The communications system of claim 22, wherein said condition sensor senses the air pressure in a tire mounted on said wheel.

24. The communications system of claim 22, wherein said circuit modifier comprises a switch that is connected in parallel with said diode, said communications system transmitting a signal with a frequency equal to twice the frequency of said excitation signal when the switch is open, and equal to the frequency of said excitation signal when the switch is closed.

25. A tire condition communications system, comprising:

a transponder antenna coil configured to be carried by a vehicle wheel;

a tire condition sensor for sensing a condition of a tire mounted on said wheel;

a diode connected in circuit with said antenna coil;

a circuit modifier that is actuated by said condition sensor to alter the connection of said diode to said antenna coil in response to said condition sensor sensing said condition crossing a threshold level in a predetermined direction, said communications system responding to an external excitation signal received by said antenna coil by transmitting a signal at one frequency when said circuit modifier is actuated, and at different frequency when said circuit modifier is not actuated, wherein said antenna coil is formed from a stiffly flexible material and has a diameter that varies around the coil, said coil being flexible enough to be deformed to pass over a rim of said wheel and thereafter to spring back to its original shape and be seated around the wheel with a portion of the antenna coil extending away from the wheel beyond the height of the wheel rim.

26. The communications system of claim 25, wherein said antenna coil has an undulating shape with portions of relatively lesser diameter that are configured to be seated around the wheel, and portions of relatively greater diameter that are configured to extend beyond the height of the wheel rim.

27. The communications system of claim 26, wherein said relatively lesser diameter portions are encapsulated in a dielectric material.

28. A wheel to vehicle low tire condition pressure communication system, comprising:

a radio frequency (RF) exciter/receiver configured to be mounted on a wheeled vehicle within transmitting range of at least one of the vehicle's wheels;

a wheel for said vehicle;

a transponder antenna coil carried by said wheel;

a tire condition sensor for sensing a condition of a tire mounted on said wheel;

a diode connected in circuit with said antenna coil;

a circuit modifier that is actuated by said condition sensor to alter the connection of said diode to said antenna coil in response to said condition sensor sensing said condition crossing a threshold level in a predetermined direction, said antenna coil responding to an RF excitation signal received from said exciter/receiver by transmitting a signal back to said exciter/receiver at one frequency when said circuit modifier is actuated, and at a different frequency when said circuit modifier is not actuated, said exciter/receiver differentiating between said two frequencies and producing an output signal that is indicative of the signal frequency which it receives from said antenna coil; and a flexible resilient grooved tube that is flexible enough to be passed over the rim of a wheel and resilient enough to thereafter be seated in place around the wheel, with said antenna coil seated in said groove.

29. The communications system of claim 28, wherein said condition sensor senses the air pressure in a tire mounted on said wheel, and said circuit modifier is actuated in response to said condition sensor sensing the tire pressure falling below a threshold pressure level.

30. The communications system of claim 28, wherein said circuit modifier comprises a switch that is connected in parallel with said diode, said antenna coil transmitting a signal with a frequency equal to twice the frequency of said excitation signal when the switch is open, and equal to the frequency of said excitation signal when the switch is closed.

31. The communications system of claim 28, said exciter/receiver including a modulator for applying a low frequency modulation to said RF excitation signal, and a signal correlator for correlating a returned signal with said low frequency modulation to verify whether the returned signal originated from said transponder circuit.

32. The communications system of claim 28, said exciter/receiver including a phase comparator for detecting synchronism between said RF excitation signal and a returned signal, to verify whether the returned signal originated from said transponder circuit.

33. A wheel to vehicle low tire condition pressure communication system, comprising:

a radio frequency (RF) exciter/receiver configured to be mounted on a wheeled vehicle within transmitting range of at least one of the vehicle's wheels;

a wheel for said vehicle;

a transponder antenna coil carried by said wheel;

a tire condition sensor for sensing a condition of a tire mounted on said wheel;

a diode connected in circuit with said antenna coil; and a circuit modifier that is actuated by said condition sensor to alter the connection of said diode to said antenna coil in response to said condition sensor sensing said condition crossing a threshold level in a predetermined direction, said antenna coil responding to an RF excitation signal received from said exciter/receiver by transmitting a signal back to said exciter/receiver at one frequency when said circuit modifier is actuated, and at a different frequency when said circuit modifier is not actuated, said exciter/receiver differentiating between said two frequencies and producing an output signal that is indicative of the signal frequency which it receives from said antenna coil, wherein said antenna coil is formed from a stiffly flexible material and has a diameter that varies around the coil, said coil being flexible enough to be deformed to pass over a rim of said wheel and thereafter to spring back to its original shape and be seated around the wheel with a portion of the antenna coil extending away from the wheel beyond the height of the wheel rim.

34. A wheel to vehicle low tire condition pressure communication system, comprising:

a radio frequency (RF) exciter/receiver configured to be mounted on a wheeled vehicle within transmitting range of at least one of the vehicle's wheels;

a wheel for said vehicle;

a transponder antenna coil carried by said wheel;

a tire condition sensor for sensing a condition of a tire mounted on said wheel;

a diode connected in circuit with said antenna coil;

a circuit modifier that is actuated by said condition sensor to alter the connection of said diode to said antenna coil in response to said condition sensor sensing said condition crossing a threshold level in a predetermined direction, said antenna coil responding to an RF excitation signal received from said exciter/receiver by transmitting a signal back to said exciter/receiver at one frequency when said circuit modifier is actuated, and at a different frequency when said circuit modifier is not actuated, said exciter/receiver differentiating between said two frequencies and producing an output signal that is indicative of the signal frequency which it receives from said antenna coil; and at least one additional wheel for said vehicle, each additional wheel having a respective additional transponder antenna coil mounted around it, an additional tire condition sensor for sensing a condition of a tire mounted on said additional wheel, an additional diode connected in circuit with said additional antenna coil, and an additional circuit modifier that is actuated by said additional condition sensor to alter the connection of said additional diode to said additional antenna coil in response to said additional condition sensor sensing said condition crossing a threshold level in a predetermined direction, said additional antenna coil responding to an excitation signal received from said exciter/receiver by transmitting a signal back to said exciter/receiver at said one frequency when said additional circuit modifier is actuated, and at said different frequency when said additional circuit modifier is not actuated.

35. The communications system of claim 34, wherein said exciter/receiver communicates with each of said transponder circuits on a time shared basis.

* * * * *